United States Patent [19]

Schuler

[11] 4,399,829
[45] Aug. 23, 1983

[54] TAPPING APPARATUS AND METHOD

[76] Inventor: Charles W. Schuler, 3674 Rushmore Dr., Columbus, Ohio 43220

[21] Appl. No.: 251,367

[22] Filed: Apr. 6, 1981

Related U.S. Application Data

[63] Continuation of Ser. No. 181,000, Aug. 25, 1980, abandoned.

[51] Int. Cl.³ .................. F16K 51/00; F16L 55/10
[52] U.S. Cl. ............................ 137/15; 29/157 T; 29/432; 83/54; 89/1 B; 102/319; 102/333; 137/318; 137/68 A; 222/81
[58] Field of Search ............... 29/157 T, 432; 137/15, 137/315, 317, 318, 319, 320, 321, 68 A; 83/54; 102/319, 333; 222/81; 89/1 B

[56] References Cited

U.S. PATENT DOCUMENTS

| 2,736,335 | 2/1956 | Webber | 137/318 |
| 3,072,138 | 1/1963 | Fabian et al. | 137/318 |
| 3,277,683 | 10/1966 | Knoblock | 137/318 |
| 3,295,398 | 1/1967 | Morain | 137/318 |
| 3,495,615 | 2/1970 | Ehrens et al. | 137/318 |
| 3,561,298 | 2/1971 | Graffenreid | 137/318 |
| 4,034,777 | 7/1977 | Gebelius | 137/318 |
| 4,205,697 | 6/1980 | Gebelius | 137/68 A |

Primary Examiner—George L. Walton
Attorney, Agent, or Firm—Robert B. Watkins

[57] ABSTRACT

A tapping apparatus and method for making connections to pipelines and vessels while they are in service and contain fluid under pressure. The tapping apparatus and method includes an explosively driven punch that is operated to penetrate the pipeline. A tensile force is applied to retract the punch, and allow the fluid to pass from the pipeline through the apparatus and into the service connection.

18 Claims, 10 Drawing Figures

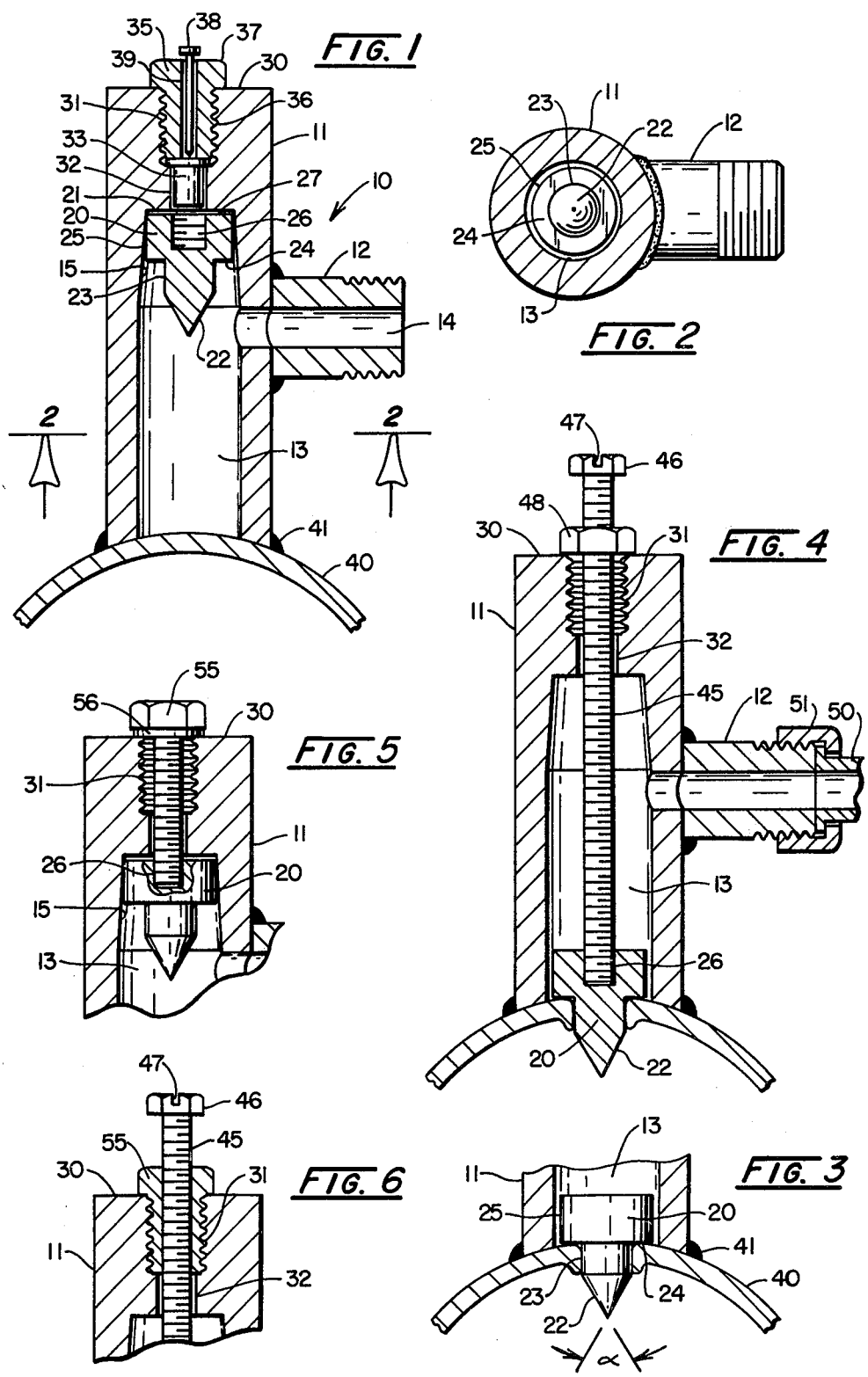

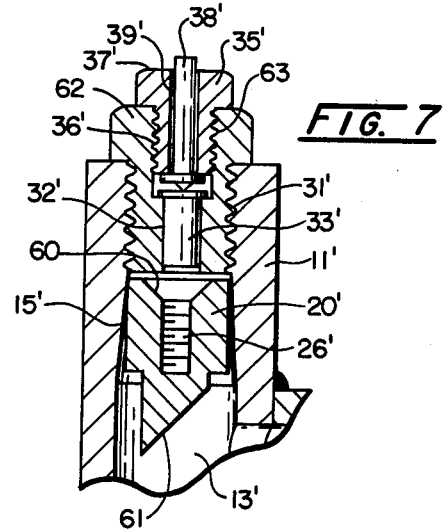
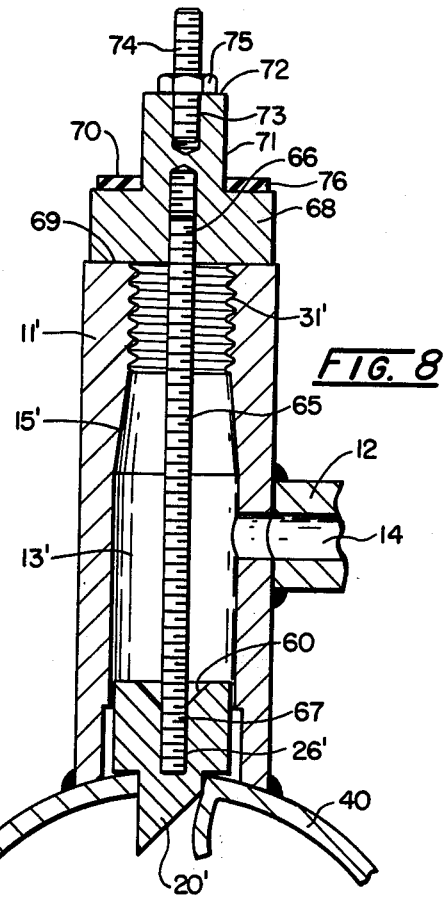
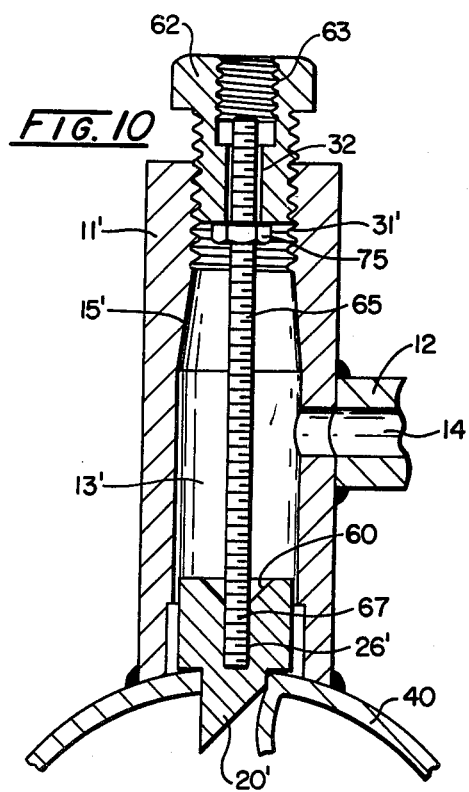
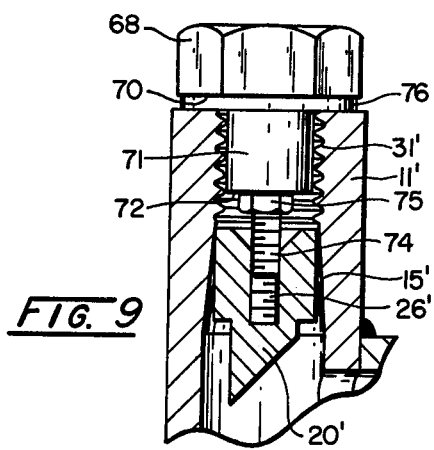

TAPPING APPARATUS AND METHOD

This application is a continuation of a co-pending application by the same inventor, Ser. No. 181,000 filed Aug. 25, 1980, and now abandoned, entitled TAPPING APPARATUS AND METHOD.

SUMMARY OF THE INVENTION

This invention relates to a tapping apparatus of the type commonly used to make a connection into a pipeline or vessel containing a fluid under pressure. In particular it relates to an apparatus for tapping into the pipeline while the pipeline contains the fluid. The tapping operation includes completing a connection of another conduit or pipe to the pipeline through the apparatus so that the fluid may pass into the connected conduit.

One very frequent use of the type of tapping apparatus of this invention is for making natural gas service line connections when a new gas service installation is made to an existing gas pipeline adjacent to a property to be serviced.

Briefly and in summary, this invention is a tapping apparatus and method for connecting a conduit to a pipeline containing a fluid comprising: a body generally in the form of a T fitting that is connectable to the exterior of a pipeline or other vessel and also connectable to a conduit such as a service connection; an explosively driven projectile punch is operable in the body to punch a hole in the pipeline; and a retraction tool is provided which is operable to withdraw the punch from the pipeline by tensile force and to allow the fluid into the body and into the conduit.

For many years a large variety of proposals have been made for tapping apparatus that provides ways to allow the connection of a conduit to a pipeline or vessel that contains a fluid under pressure without the necessity of reducing the pressure or withdrawing the fluid from the pipeline during the connection. This is a significant problem in that there are many such connections made. It would be inconvenient to discontinue fluid low in the pipeline every time another connection had to be made. The inconvenience would be intolerable if the natural gas in a service pipeline in a city street had to be turned off every time a new connection for gas service was made or a repair was required on an existing service connection. All of the various proposals which have been put into practice have not been completely satisfactory in one way or another.

The tapping apparatus that has seen considerable use is that shown in U.S. Pat. Nos. 3,295,398 and 4,029,118 in which a cutter is turned down through an internally threaded body member to cut out and withdraw a coupon of a pipeline leaving a hole for the fluid to pass out into the new service conduit. These patents are improvements over U.S. Pat. No. 3,094,137 where a threaded cutter is used to make a hole by cutting a coupon in the pipeline and leaving the coupon in the pipeline.

These patents have met with a measure of success but have the disadvantage that they require a considerable amount of valuable time to thread the cutter forward through the pipeline, since the pipeline is usually made of steel or other hard material and arduous labor is required for the piercing operations.

In order to speed up the time of penetration, various apparatus and procedures have been proposed including U.S. Pat. Nos. 3,612,084, 3,072,138 and 4,034,777 for penetrating a pipeline with an explosive charge.

In view of these prior art approaches to the problem, it is an object of this invention to provide an explosively driven tapping apparatus which is more reliable, less expensive to manufacture, more versatile over a range of pipeline and connection sizes.

In order to meet the objective of providing a more reliable explosively driven tapping apparatus, this invention includes a retraction tool that positively withdraws the punching tool by tensile force which is applied through the engagement of threading.

Other objectives and features of the invention will be apparent from the following drawings and detailed description of the invention.

IN THE DRAWINGS

FIG. 1 is an elevational cross-sectional view of the tapping apparatus of this invention, in assembled position ready for the punching step in the process of making a connection.

FIG. 2 is a cross-sectional plan view taken along the line 2—2 of FIG. 1.

FIG. 3 is an elevational cross-sectional view of a portion of the tapping apparatus at the end of the punching step in the process of making a connection.

FIG. 4 is an elevational cross-sectional view of the tapping apparatus of this invention, in assembled position ready for the retraction step in the process of completing a connection.

FIG. 5 is an elevational cross-sectional view of the tapping apparatus in final sealed and operating position.

FIG. 6 is an elevational partial cross-sectional view of the outer end of the tapping apparatus when arranged for a reinsertion of a punch.

FIG. 7 is a partial elevational cross-sectional view of another embodiment of the apparatus of this invention, in assembled position ready for the punching step in the process of making a connection.

FIG. 8 is an elevational cross-sectional view of the embodiment in FIG. 7 of a tapping apparatus of this invention, in assembled position ready for the extraction step in the process of completing a connection.

FIG. 9 is a partial elevational cross-sectional view of the embodiment shown in FIG. 7 in final sealed and operating position.

FIG. 10 is a partial elevational cross-sectional view of the embodiment shown in FIG. 7, when arranged for reinsertion of a punch.

DETAILED DESCRIPTION OF THE INVENTION

Referring to FIGS. 1 and 2, a tapping apparatus 16 comprises a cylindrical body means 11 and a lateral connection means 12. The body 11 has an axial bore 13 which is intersected by a lateral bore 14 of the connection 12. The bore 13 has a slightly tapered portion 15 outwardly of the connection 12. The amount of the taper of the portion 15 is shown exaggerated in FIG. 1 for clarity purposes only.

A projectile/punch 20 is seated at an end wall 21 of the bore 13. Punch 20 is generally cylindrical in shape and coaxial with the bore 13. It is formed with a conical nose portion 22 meeting a shaft portion 23 that intersects a shoulder 24 which meets a peripheral edge 25. At an end 27 opposite to the conical nose 22, the punch 20 is provided with a threaded cavity 26. Because of the tapered portion 15, the peripheral portion 25 engages the bore 13 in a very light press fit so that the punch 20 remains in the end position shown in FIG. 1 until forced downward, as will be later explained.

At an external end 30, the body 11 is provided with a threaded recess 31 and a counter bore 32 providing communication between the recess 31 and the bore 13. Counter bore 32 and recess 31 combine to form a chamber in which is placed a cartridge 33 containing a gunpowder charge. Cartridge 33 may be of the conventional blank type or may be a special cartridge having a load designed for the situation in which it is used. A breech fitting 35 comprising an externally threaded portion 36 and a nut portion 37 is threadedly engaged in the recess 31 and contains a firing pin 38 slidingly positioned in a cylindrical bore 39.

The operation and use of the tapping apparatus 16 is carried out in a sequence of steps the first of which is the connection of the body 11 to a pipeline or vessel 40 which may contain a fluid under pressure. The connection may be by suitable means such as with welds 41, although various other clamping means might be acceptable, such as a saddle clamp.

When a tapping apparatus 16 has been assembled to the pipeline 40, and when the punch 20, cartridge 33, and breech fitting 35 are in place, a blow is delivered to the firing pin 38. The impact on the firing pin 38 causes it to detonate the cartridge 33 which explosively drives the punch 20 through the bore 13 into contact with the pipeline 40.

Upon striking the pipeline 40 the punch 20 pierces pipeline 40, as shown in FIG. 3. The degree of taper of the conical nose 22 and the amount of gunpowder or other explosive material in the cartridge effects the degree of penetration through the pipeline 40. Other factors having an effect on the penetration results are the hardness and other physical properties of the pipeline material. In most instances, with the proper choice of design parameters, the shoulder 27 of the punch 20 will come to rest on the outer surface of the pipeline 40 preventing further penetration by the nose 22. Also with the proper selection of design parameters and the proper hardening of the surface of conical nose 22, there is no fusion between the material of the punch 20 and the pipeline 40, so that the heat of penetration does not cause any welding between the two.

After the punch 20 has been explosively driven into pipeline 40, the breech fitting 35 is unscrewed from the recess 31 and withdrawn. Following this the empty cartridge 33 is removed.

As seen in FIG. 4, in the next step of the use of the tapping apparatus 16, an extraction tool means in the form of a threaded bolt 45 is rotated into threaded engagement in the recess 26 by insertion through the counter bore 32. Rotation may be accomplished by means of a conventional bolt head 46 or slot 47. A nut 48 is threadedly engaged on the bolt 45 before it is inserted into the punch 20.

Either at the time the body 11 is fastened to the pipeline 40 or before the next step in the process of the tapping operation, a coupling means 51 for a conduit 50 is fastened over the connection 12.

In the next step in the use of the tapping apparatus 16, the punch 20 is retracted from the pipeline 40 by rotation of the nut 48 while the bolt 45 is prevented from rotation by the head means 46 or the slot 49. It has been found that even though the punch 20 is very tightly engaged in the pipeline 40, it can be extracted by the tensile force exerted in reaction to the pressure of the nut 48 against the end 30.

After the punch 20 is loosened it can be withdrawn and pulled up into the taper portion 15 of the bore 13, either by physical force of the workman who is operating the tapping apparatus or by use of the bolt and nut 45, 48, respectively.

Once the punch 20 is withdrawn past the bore 14 of the connection 12, the fluid in the pipeline 40 will pass into the conduit 50 and the connection between the pipeline and the conduit has been made.

Referring to FIG. 5, in order to make the seal permanent and yet to leave the possiblity of further access, after the connection has been made, the bolt 45 can be disengaged from the recess 26 and removed from the body 11. A bolt or socket head cap screw 55 having a compressible seal 56 is then engaged in the threaded cavity 26 as a closure. Sealing, as well as fixation against rotation, is also provided by the engagement of the edge 25 in the tapered portion 15.

Those skilled in the art will appreciate that the configuration of the punch may be varied according to requirements and conditions. A tapping apparatus may be provided with a variety of punches each of which is suitable for a predetermined condition that the user may encounter. Punches may have conical pointed noses with relatively blunt tapers or may be furnished with longer sharper tapers. They may have various degrees of curvature. Punches may have chisel pointed noses as well as other penetrating shapes.

It is desirable, however, that the punch be configured so that it penetrates completely and without fusion to the pipeline. It has been found that a punch with a conical nose 22 of straight taper having an angle alpha of 20 degrees and having a diameter at the shaft portion 23 of 0.750 inches will penetrate a pipeline of a thickness of 0.237 inches without fusion. The above example of the punch was driven by a 0.357 caliber blank cartridge.

It has been found that when the punch is provided with an appropriate conical nose 22 for the conditions in which it is used and it is driven through the pipeline until the shoulder 27 contacts the pipeline, a smoothly infolded hole is made in the pipeline.

It is another important advantage of the tapping apparatus of this invention that in an emergency the extraction tool means, bolt 45, may be reinserted into the punch 20 and used to force the punch back down below the lateral bore 14 of the connection 12. This acts as a plug to substantially impede fluid flow into conduit 50. To accomplish this a nut 55 is provided (FIG. 6) similar to nut 48, except having both internal threads to engage bolt 45, and external threads engaged in threaded recess 31. The bolt 45 is screwed down through the nut 55 which forces the punch back down.

Although the punch 20 may not reseat tightly in the hole, or even reenter the hole in the pipeline, it will substantially impede fluid flow and this is considered adequate by industry in an emergency situation.

Referring to FIGS. 7, 8 and 9, another embodiment of this invention is shown in which the body means 11' receives and holds a projectile/punch 20' in a tapered portion 15' of a bore 13'. The punch 20' is provided with a threaded cavity 26' concentric with a conical counter bore 60 at one end. At the opposite end, the punch 20' is provided with a tapered chisel point 61.

As in the previous embodiment the body means 11' has a threaded recess 31'. The threads of recess 31' engage a barrel means or member 62. Barrel means 62 is provided with a threaded recess 63 and a counter bore 32'.

Counter bore 32', recess 63, and a breech fitting 35' combine to form a chamber in which is placed a cartrige 33' containing a gun powder charge. As in the previous embodiment, cartridge 33' may be a conventional blank or may be a special cartridge having a load designed specifically for this use. The breech fitting 35', comprising an externally threaded portion 36' and a nut portion 37' is threadedly engaged in the recess 63, and contains a firing pin 38' slidingly positioned in a cylindrical bore 39'.

The operation and use of the tapping apparatus of the embodiment of FIGS. 7-9 is the same as that for the embodiment of FIGS. 1-6, except that cartridge 33' is assembled in the chamber of the barrel 62 and breech fitting 35' while the barrel 62 is disassembled from the body means 11'. After "loading" the barrel 62 is threaded into the recess 31', and the punch 20' is driven down into the pipeline 40, as explained above. After the cartridge is fired by striking the firing pin 38' the barrel means is unscrewed and withdrawn from engagement with the threaded recess 31' of the body means 11'. The barrel means 62 may then be disassembled and the cartridge discarded. Following this the barrel means is reassembled with a fresh cartridge and used again to operate another tapping process in another body means.

After the barrel means 62 is removed an extractor bolt 65, which is threaded at an upper end 66 as well as a lower end 67, is threadedly engaged in the threaded cavity 26' of the punch 20'. Engagement is guided by the conical counter bore 60. An extractor nut 68 is threadedly engaged on the upper end 66 of the bolt 65. Rotation of the nut 68 presses a surface 69 against the body means 11' exerting a tensile force on the bolt 65 and the punch 20' to withdraw the punch from the pipeline and allow the fluid into the body and into the conduit.

Referring to FIGS. 8 and 9, extractor nut 68 is constructed with shoulder 70 meeting a cylindrical portion 71 leading to an end 72. The end 72 is provided with a threaded portion 73 which is threaded engaged by a stud 74 with a nut 75. A compressible seal 76 encircles the cylindrical portion 71 and rests upon the shoulder 70.

After the punch 20' is withdrawn by the tensile force of the extractor bolt 65, the punch 20' is then shifted to a position of engagement in the light press fit of the tapered portion 15', using the extractor nut 68 as a handle. Extractor bolt 65 and extractor nut 68 are then disengaged from each other and from the punch 20'.

The extractor nut 68 is then longitudinally reversed and the cylindrical portion 71 is inserted in the recess 31' by rotating the extractor nut 68 together with the stud 74 into the threaded cavity 26' of the punch 20'. The continued rotation of the extractor nut 68 pulls the punch 20' more tightly into the tapered portion 15' compressing the compressible seal 76. This closes the top of the body portion 11'.

Referring to FIG. 10, as in the previous embodiment, if necessary at a later date, the extractor nut 68 may be removed by threaded disengagement of the stud 74 from recess 26', and then the extractor bolt 65 reinserted. The nut 75 is then threaded on the extractor bolt 65 to act as shoulder. The barrel means 62 is placed over the extractor bolt 65 and screwed down into the threaded recess 31' against the nut 75. Continued turning of the barrel means 62 forces the punch 20' back down past the lateral bore 14. This acts as a temporary, partial shut off, preventing excessive fluid flow into the conduit.

It will be seen that it is an advantage of this invention that the tapping apparatus can be used relatively quickly since the arduous task of screwing a cutter down through the pipeline is avoided by the rapidity of the explosive tapping procedure.

Another advantage of this invention is that the material punched out of the pipeline is not severed from the pipeline and does not fall into the pipeline. Therefore, it cannot move down the pipeline to foul other valves and connections, which has been a problem with other tapping apparatus in the past.

In the embodiment shown in FIG. 7, firing pin 38' is provided with a shoulder at the lower end that prevents a possible malfunction in which the cap on the cartridge would reverse fire and propel the firing pin 38' up and out. The shoulder retains the firing pin 38' in the breech fitting 35'.

It is herein understood that although the present invention has been specifically disclosed with the preferred embodiments and examples, modification and variations of the concepts herein disclosed may be resorted to by those skilled in the art. Such modifications and variations are considered to be within the scope of the invention and the appended claims.

What is claimed is:

1. A tapping apparatus for connecting a conduit to a pipeline containing a fluid comprising:
   a. body means connectable to the exterior of pipeline and connectable to the conduit;
   b. an explosively driven punch means operable in the body means to punch a hole in the pipeline; and
   c. retraction means insertable after the operation of the punch means, and operable by tensile force applied by gripping engagement with the punch to overcome the possibility of the punch sticking, to positively withdraw the punch from the pipeline and allow the fluid into the body and into the conduit.

2. A tapping apparatus according to claim 1 wherein the body means is provided with a chamber for an explosive cartridge and a breech fitting to hold the cartridge in the chamber, and the breech fitting is provided with a firing pin that is movable to detonate the cartridge.

3. A tapping apparatus according to claim 2 wherein the breech fitting is engaged with threads provided in the body means.

4. A tapping apparatus according to claim 1 wherein the punch means comprises a cylindrical body having a pointed end portion for penetrating the pipeline and an enlarged collar portion adjacent to the pointed end to stop the penetration of the point in the pipeline.

5. A tapping apparatus according to claim 1 wherein the punch is provided with an internally threaded recess at the end opposite to the point to receive a threaded bolt end of the retraction means.

6. A tapping apparatus according to claim 5 wherein a threaded nut is provided on the threaded bolt of the retraction means, in contact with the surface of the body means which is rotatable against the body means to retract the punch from the pipeline by tensile force.

7. A tapping apparatus according to claim 1 wherein sealing means is insertable into the body means after the retraction means is withdrawn to seal the body means against passage of the fluid from the body means outward to the atmosphere surrounding the tapping apparatus.

8. A tapping apparatus according to claim 7 wherein the sealing means is a threaded bolt engagable in the punch.

9. A tapping apparatus according to claim 1 wherein the body means is provided with a barrel means, constructed with a chamber for an explosive cartridge and a recess for a breech fitting to hold the cartridge in the chamber, and the breech fitting is provided with a firing pin that is movable to detonate the cartridge.

10. A tapping apparatus according to claim 9 wherein the barrel means is engaged with threads provided in the body means.

11. A tapping apparatus according to claim 1 wherein the body means is provided with a bore in which the punch is operable, and the bore is provided with a taper at one end reducing the bore size to a light press fit on the punch means, at the one end.

12. A method of connecting a conduit to a pipeline containing a fluid comprising:
   a. connecting an apparatus body having an internal bore to the pipeline;
   b. connecting the conduit to the apparatus body and the bore;
   c. explosively forcing a punch through the bore in the body into contact with the pipeline, piercing the pipeline; and
   d. retracting the punch by tensile force applied in gripping engagement with the punch to overcome the possibility of the punch sticking and to positively withdraw the punch through the bore, to allow the fluid into the bore and into the conduit.

13. A method according to claim 12 wherein the bore is sealed after the punch is retracted by forcing the punch against an end of the bore.

14. A method according to claim 12 wherein step (c) includes: providing a chamber in connection with the body and inserting an explosive cartridge into the chamber, providing a breech to close the chamber with a firing pin in operative position above the cartridge, and striking the firing pin against the cartridge.

15. A method according to claim 12 wherein step (c) includes providing a barrel means in connection with the body and providing a chamber in connection with the barrel means and inserting an explosive cartridge into the chamber, providing a breech to close the chamber with a firing pin in operative position above the cartridge, and striking the firing pin against the cartridge.

16. A method according to claim 15 wherein additionally the following steps are carried out:
   e. removing the barrel means after the firing pin is struck, removing the spent cartridge, inserting a second fresh explosive cartridge into the chamber, and inserting the reloaded barrel means in a second apparatus body.

17. A tapping apparatus for connecting a conduit to a pipeline containing a fluid comprising:
   a. body means connectable to the exterior of pipeline and connectable to the conduit;
   b. an explosively driven punch means operable in the body means to punch a hole in the pipeline;
   c. retraction means insertable into the punch means after the punching operation of the punch means, and operable by tensile force to withdraw the punch from the pipeline and allow the fluid into the body and into the conduit, with the retraction means further operable to withdraw the punch means into a sealed wedge fit in a tapered section of the bore before the retraction means is removed; and
   d. seal means including a cap screw with a resilent seal pressed between the body and the cap screw by the action of threading the cap screw into the punch after the retraction means is removed.

18. A method of connecting a conduit to a pipeline containing a fluid comprising:
   a. connecting an apparatus body having an internal bore to the pipeline;
   b. connecting the conduit to the apparatus body and the bore;
   c. explosively forcing a punch through the bore in the body into contact with the pipeline, piercing the pipeline;
   d. retracting the punch by tensile force through the bore by means of a threaded bolt being threaded in the punch to allow the fluid into the bore and into the conduit;
   e. removing the threaded bolt and replacing it with capping means having a seal between the body and the capping means; and
   f. thredly engaging the capping means in the punch for further withdrawing the punch into a tight wedge fit in a taper in the bore and compressing the seal on the end of the bore.

* * * * *